US012708991B2

(12) United States Patent
Ponçot et al.

(10) Patent No.: US 12,708,991 B2
(45) Date of Patent: Aug. 18, 2026

(54) FASTENING TOOL WITH AN ADJUSTMENT TOOL AND FASTENING SYSTEM

(71) Applicants: Faurecia Innenraum Systeme GmbH, Hagenbach (DE); Skartek s.r.o., Vlckovce (SK)

(72) Inventors: Alexis Ponçot, Karlsruhe (DE); Benoit Guyon, Trnava (SK)

(73) Assignees: Faurecia Innenraum Systeme GmbH, Hagenbach (DE); Skartek s.r.o., Vlkovce (SK)

( * ) Notice: Subject to any disclaimer, the term of this patent is extended or adjusted under 35 U.S.C. 154(b) by 0 days.

(21) Appl. No.: 18/752,264

(22) Filed: Jun. 24, 2024

(65) Prior Publication Data

US 2025/0018544 A1 Jan. 16, 2025

(30) Foreign Application Priority Data

Jul. 13, 2023 (DE) .................... 10 2023 118 600.0

(51) Int. Cl.
*B25D 17/00* (2006.01)

(52) U.S. Cl.
CPC .................................. *B25D 17/00* (2013.01)

(58) Field of Classification Search
CPC ......... B25D 17/00; B25C 1/047; B25C 1/008; B25C 1/188; B25C 1/06; B25C 1/00; B25C 1/005; B25C 1/184; B25C 5/1665; B25C 1/001
See application file for complete search history.

(56) References Cited

U.S. PATENT DOCUMENTS

| | | | | |
|---|---|---|---|---|
| 3,742,577 | A | 7/1973 | Buttriss | |
| 7,111,767 | B2 | 9/2006 | Losada | |
| 7,617,883 | B1 | 11/2009 | Mangone, Jr. | |
| 2018/0093370 | A1* | 4/2018 | Yip | B25C 1/005 |
| 2023/0056376 | A1* | 2/2023 | Hasegawa | B25C 1/047 |

FOREIGN PATENT DOCUMENTS

| | | | |
|---|---|---|---|
| JP | 061334 | Y2 | 1/1994 |
| WO | WO-8200429 | A1 | 2/1982 |

OTHER PUBLICATIONS

"German Application No. 10 2023 118 600.0, Search Report dated Mar. 13, 2024", (Mar. 13, 2024), 12 pgs.

* cited by examiner

*Primary Examiner* — Veronica Martin
(74) *Attorney, Agent, or Firm* — Schwegman Lundberg & Woessner, P.A.

(57) ABSTRACT

A fastening tool can comprise an impact tool to convey one fastening element at a time along an impact axis from a loading position to a workpiece. The fastening tool configured to accommodate a magazine in which a plurality of fastening elements are arranged displaceably one behind another along a loading path in a conveying direction towards the loading position. The fastening tool comprising an impact tool to convey one fastening element at a time along an impact axis from a loading position within the fastening tool to a workpiece. The fastening tool configured to accommodate a magazine in which a plurality of fastening elements are arranged displaceably one behind another along a loading path in a conveying direction towards the loading position. The adjustment tool including an adjustment surface to displace a particular fastening element to or hold the particular fastening element in a desired position.

11 Claims, 5 Drawing Sheets

FASTENING TOOL WITH AN ADJUSTMENT TOOL AND FASTENING SYSTEM

CLAIM FOR PRIORITY

This application claims the benefit of priority of German Application No. 10 2023 118 600.0, filed Jul. 13, 2023, which is hereby incorporated by reference in its entirety.

TECHNICAL FIELD

The present disclosure relates to the field of mechanical engineering and manufacturing and assembly technology. Specifically, the present disclosure is directed to assembly processes in automotive engineering.

BACKGROUND

A large number of fastening elements of various shapes are known for fastening or connecting different components or structural elements, some of which can be attached by hand in individual applications, but many of which can also be attached by automated production machines. Many fastening elements hold components together by a force fit, others by a form fit. Fastening elements with wire pins and clamps, for example, are known.

SUMMARY

A particular challenge in this regard is the quickest use of several fastening elements one after the other by a tool, wherein the fastening elements are usually arranged one behind the other in a magazine and conveyed automatically.

U.S. Pat. No. 7,111,767 B2, for example, discloses a fastening tool with which fastening elements in the form of angled plates are combined with nails. These are automatically conveyed to a position from which they are fastened to a component using an impact element. On the conveying path in the magazine of the tool, the fastening elements are each held individually by a fixing element before reaching this position until the path to the impact element is free.

Against the backdrop of the state of the art, the present disclosure is based on the object of providing a fastening tool, an adjustment tool and a fastening system which allow fastening elements to be processed quickly one after the other and ensure that the fastening elements can be used reliably and without interference.

Accordingly, the present disclosure relates to a fastening tool for applying fastening elements to a workpiece, having an impact tool which is set up to convey one fastening element at a time along an impact axis from a loading position within the fastening tool to a workpiece, wherein the fastening tool is set up to accommodate a magazine in which a plurality of fastening elements are arranged displaceably one behind the other along a loading path in a conveying direction towards the loading position, wherein an adjustment tool having at least one adjustment surface is provided and is guided movably counter to the conveying direction of the fastening elements in such a way that it engages in the loading path, wherein at least one adjustment surface is set up to displace a fastening element counter to the conveying direction and/or in at least one direction perpendicular to the conveying direction into a desired position and/or to hold it in a desired position by acting forcefully on the fastening element.

The loading path refers to the region that is covered by the fastening elements on their way to the desired position. The loading path can be straight or curved and runs parallel to the conveying direction in the region of the desired position. The loading path can be defined by one or more rails on which the fastening elements are mounted so that they can be displaced one behind the other, as well as by the space that the fastening elements pass through or occupy during their movement on a rail. The rails can be dimensioned and positioned in such a way that the fastening elements are guided in the rail(s), but can be moved to a limited extent perpendicular to their conveying direction in order to allow for manufacturing tolerances that lead to varying sizes of the fastening elements.

The fastening elements can be conveyed along the loading path, for example, by the force of a spring arranged at the end of the loading path. The desired position can be arranged on the loading path upstream of the loading position so that after adjustment, when the adjustment tool is moved to the release position, a fastening element is conveyed from the desired position to the loading position. While the fastening elements can lie against each other directly and without gaps in a magazine when they are conveyed to the desired position, it can be provided that the fastening element in the desired position is moved slightly away in this position from the fastening element in the loading position in the conveying direction so that the fastening element struck by the impact tool and the impact tool itself do not collide or generally interact with the penultimate fastening element which is located in the desired position upstream of the loading position. For this reason, it can be provided to allow the fastening elements to move in the conveying direction after each actuation of the impact tool and then to push the penultimate fastening element back slightly counter to the conveying direction through the adjusting element to distance it from the loading position.

The fastening element can accommodate a magazine for the fastening elements or directly contain a magazine that can be filled with fastening elements.

An advantageous embodiment of the present disclosure can provide that the adjustment tool is arranged pivotably between an adjustment position and a release position, wherein the adjustment tool in the adjustment position is in engagement with the fastening element which has been displaced and/or is to be held in the desired position, and wherein the adjustment tool in the release position releases the movement of the fastening elements along the loading path towards the loading position.

The adjustment tool can be moved, in particular pushed, into the adjustment position by the movement of the impact tool when it conveys a fastening element to a workpiece. A part of the impact tool or a part mechanically connected or coupled thereto can act directly on the adjustment tool and move it.

When the impact tool moves back from the workpiece, it can release the adjustment tool so that it is moved into the release position by a spring drive, for example.

An adjustment tool in the form of a fixed, pivotably mounted lever is particularly suitable for being pivoted into and out of the loading path counter to the conveying direction. For example, the lever/adjustment tool can be swung into the adjustment position, i.e. into the loading path, for example by a spring force and swung out of said adjustment position by a drive, or vice versa. The impact tool can be blocked by a mechanical lock until the adjustment tool has been brought into the adjustment position. The impact tool can then be released in this position.

It can also be provided that the adjustment tool has one or more adjustment surfaces in the form of inclined surfaces which are set up to interact with parts of a fastening element and exert a displacement force thereon perpendicular to the conveying direction. One or more of the inclined surfaces of the adjustment tool can be oriented in such a way that they engage with a region of a fastening element when the adjustment tool is displaced counter to the conveying direction and displace the fastening element in a direction perpendicular to the conveying direction by means of a wedge effect. All inclined surfaces of the adjustment tool can be designed at least partially as flat surfaces, but also at least partially as curved surfaces.

It can also be provided that the fastening tool is set up to process fastening elements with a base and two legs fastened to the base, wherein the adjustment tool has at least two adjustment surfaces in the form of lateral inclined surfaces which are oriented opposite one another in such a way that in each case one of the inclined surfaces comes into contact with a leg of a fastening element. For example, at least two adjustment surfaces in the form of lateral inclined surfaces can be oriented relative to each other in such a way that they or their imaginary extensions intersect in a line which runs perpendicular to the conveying direction when the adjustment tool is in the adjustment position.

In the event that the fastening tool is used to process fastening elements that have two legs fastened to a base, for example metal or wire clips or sheet metal clips, two lateral inclined surfaces on the adjustment tool can be oriented in such a way that, when the adjustment tool is brought into the adjustment position, they slide into the intermediate region between the legs of the next fastening element and act on the legs from this region and center the corresponding fastening element. If only two such inclined surfaces are provided opposite each other, the centering can take place along an axis that runs transverse to the conveying direction, for example perpendicular to the conveying direction. In many cases, the fastening elements are moved within a rail and rest on the rail due to gravity, so that adjustment is primarily required perpendicular to the direction of gravity. In many cases, however, adjustment in a plurality of directions perpendicular to the conveying direction can also be useful.

In order to realize the two aforementioned inclined surfaces, it can be provided, for example, that, when the adjustment tool is in the adjustment position, at least two adjustment surfaces are arranged in the form of lateral inclined surfaces mirror-symmetrically with respect to a symmetry surface in which both the impact axis and the conveying direction run. The lateral inclined surfaces can be oriented towards each other like the roof slopes of a pitched roof, wherein the upper edge of the roof is cut off. However, the inclined surfaces can also be oriented at an angle to each other in order to generate not only centering, but also a resulting contact pressure on the fastening elements in the direction of a contact surface on which the fastening elements rest on the rail.

A further embodiment can provide that the adjustment tool has an adjustment pyramid which is designed in particular as a truncated pyramid, further in particular as a 5-sided truncated pyramid, and is delimited by adjustment surfaces in the form of inclined surfaces. When the adjustment tool is in the adjustment position, the adjustment pyramid faces the desired position of the fastening elements. In addition to two lateral inclined surfaces, two adjustment surfaces in the form of two upper inclined surfaces can be provided as boundary surfaces of the pyramid, which run towards each other in the form of a ship's bow and form an edge of the pyramid in the region in which they adjoin each other, which edge faces the free, pivotable end of the adjustment tool. In the release position of the adjustment tool, this edge faces the last adjusted fastening element in its desired position, which is moved from the desired position to the loading position when the adjustment tool is in the release position and is further guided by the upper inclined surfaces during this movement. Opposite this edge, the adjustment pyramid can be limited by a further surface that adjoins the two lateral inclined surfaces.

In principle, instead of an adjustment pyramid, the adjustment tool can have an elevation which, when the adjustment tool is in the adjustment position, faces the desired position of the fastening elements and which has various inclined surfaces which are oriented differently. The inclined surfaces can be rounded, but they can advantageously also have flat inclined surface regions or be designed as completely flat inclined surfaces which interact with regions of a fastening element to be adjusted.

The present disclosure can be further advantageously implemented in that the adjustment tool has at least one adjustment surface in the form of a stop surface which, when the adjustment tool is in the adjustment position in which it is in engagement with a fastening element to be displaced in its desired position, is oriented perpendicular to the conveying direction and which is set up in such a way that it strikes against a surface or edge of the fastening element which is oriented in particular perpendicular to the conveying direction.

The stop surface therefore serves to push the fastening element closest to the adjustment tool back slightly counter to the conveying direction and/or to hold it in a position at a distance from the loading position.

It can also be provided that the adjustment tool has the shape of a pivoting lever and tapers towards its free end in the region of the stop surface, in particular in its projection onto a surface which is perpendicular to the conveying direction when the adjustment tool is in the adjustment position.

This lever can be pivotably mounted on a pivot axis which is spaced from the loading path and runs transversely to the conveying direction, in particular perpendicularly to the conveying direction, and it can then be pivoted into the loading path from outside the loading path in such a way that its movement in the region immediately before reaching the adjustment position runs completely or approximately parallel to the conveying direction. In this adjustment position, the adjustment tool is in the way of the fastening elements and can bring the next fastening element into a desired position both laterally and in the conveying direction. From this adjusted position, a fastening element can then be moved into the loading position as soon as the adjustment tool clears the way by pivoting back. In this release position, the inclined surfaces can still, in particular exclusively, project into the loading path so that in particular the upper inclined surfaces, but also optionally the lateral inclined surfaces, can guide a movement of a fastening element in the direction of the loading position so that the adjustment in the directions perpendicular to the conveying direction is maintained.

The fastening tool can, for example, be set up to process fastening elements with a base and two legs fastened to the base, wherein the longitudinal extension directions of the legs of a fastening element enclose an angle of less than 180 degrees, in particular less than 135 degrees, further in particular less than 90 degrees. Often the legs of a fastening element or at least their longitudinal extension directions, when viewed in the conveying direction, will run parallel to each other or approximately parallel to each other, or will only enclose an acute angle with each other, in particular if the fastening elements are designed as fastening clips.

The fastening tool can also be set up to process fastening elements with a base and two legs fastened to the base, wherein both the base and the legs are in each case formed by metal sheets which extend in the conveying direction in the desired position of the fastening elements.

The longest longitudinal extension of the metal sheets or the longest side can be oriented parallel to the conveying direction.

In this embodiment, in which the fastening elements consist of metal sheets that are bent or connected at an angle to one another, the fastening elements can also have a sheet metal tongue partially punched out of the metal sheet in the region of each of the legs, which sheet metal tongue is bent out of the leg in the direction of the other leg. These sheet metal tongues can each form stop surfaces which are used with a stop surface of the adjustment tool to adjust the fastening element in the conveying direction.

In addition to a fastening tool of the type described above, the present disclosure also relates to an adjustment tool for a fastening tool for applying fastening elements to a workpiece, wherein the fastening tool has an impact tool which is designed to convey a fastening element along an impact axis from a loading position within the fastening tool to a workpiece, wherein at least one fastening element is displaceable in the fastening tool in a conveying direction towards the loading position, and wherein the adjustment tool has a plurality of adjustment surfaces in the form of inclined surfaces for adjusting a fastening element, and/or the adjustment tool has at least one adjustment surface in the form of a stop surface which, when the adjustment tool is in the adjustment position in which it is in engagement with a fastening element to be displaced, limits a movement of the fastening element in the conveying direction.

The adjustment tool can be moved, in particular pivoted, in a direction counter to the conveying direction. When the adjustment tool is in the adjustment position, the inclined surfaces of the adjustment tool can be used to adjust a fastening element in one or more directions perpendicular to the conveying direction. Furthermore, the adjustment tool can be designed as a pivotable lever which, on a side surface facing the fastening elements, has an elevation, in particular in the form of a pyramid, in particular a five-sided pyramid or a truncated pyramid, which is delimited by adjustment surfaces in the form of inclined surfaces. In the position of the adjustment tool in which it engages with a fastening element, two lateral inclined surfaces of the elevation are oriented mirror-symmetrically with respect to each other in such a way that their surface normals run horizontally when the adjustment tool is in the adjustment position.

In the position of the adjustment tool in which it engages with a fastening element, two upper inclined surfaces of the elevation are oriented in such a way that their surface normals run obliquely upwards at an acute angle with respect to the conveying direction so that the two upper inclined surfaces form the shape of a ship's bow. This ship's bow can point upwards in the adjustment position and towards the desired position of the fastening elements in the release position.

In a release position, the adjustment tool can release the movement of a fastening element from an adjustment position to a loading position. The elevation on the side surface of the adjustment tool can still project into the movement path of the fastening element and guide its movement towards the loading position so that at least the adjustment in directions perpendicular to the conveying direction is maintained.

In addition to a fastening tool and an adjustment tool, the present disclosure also relates to a magazine for a fastening tool for applying fastening elements to a workpiece, which magazine has an impact tool which is set up to convey one fastening element at a time along an impact axis from a loading position within the fastening tool to a workpiece, wherein a plurality of fastening elements are arranged in the magazine so as to be displaceable one behind the other in a conveying direction towards the loading position, and wherein the magazine is set up to interact with an adjustment tool of the above-described type in such a way that the adjustment tool holds a fastening element in a desired position upstream of the loading position and releases it in the course of a pivoting movement to be conveyed into the loading position.

The present disclosure also relates to a fastening system having a fastening tool of the type described above and having a plurality of fastening elements which are set up to be displaced one behind the other in a conveying direction in the direction toward the loading position.

In addition, the invention also relates to a method for conveying fastening elements arranged one behind the other within a magazine of a fastening tool to a loading position in the conveying direction, from which loading position a fastening element can be conveyed to a workpiece by means of an impact tool, wherein a force is exerted on the fastening elements by means of a drive element in the direction of the loading position, and wherein a fastening element located directly upstream of the loading position is displaced into a desired position or held in a desired position by an adjustment tool that moves counter to the conveying direction for adjustment parallel to the conveying direction, and is adjusted in particular perpendicular to the conveying direction by at least one adjustment surface in the form of an inclined surface.

BRIEF DESCRIPTION OF THE FIGURES

In the following, the present disclosure is illustrated on the basis of exemplary embodiments in figures of a drawing and explained below. In the drawings.

DETAILED DESCRIPTION

Figure 1:
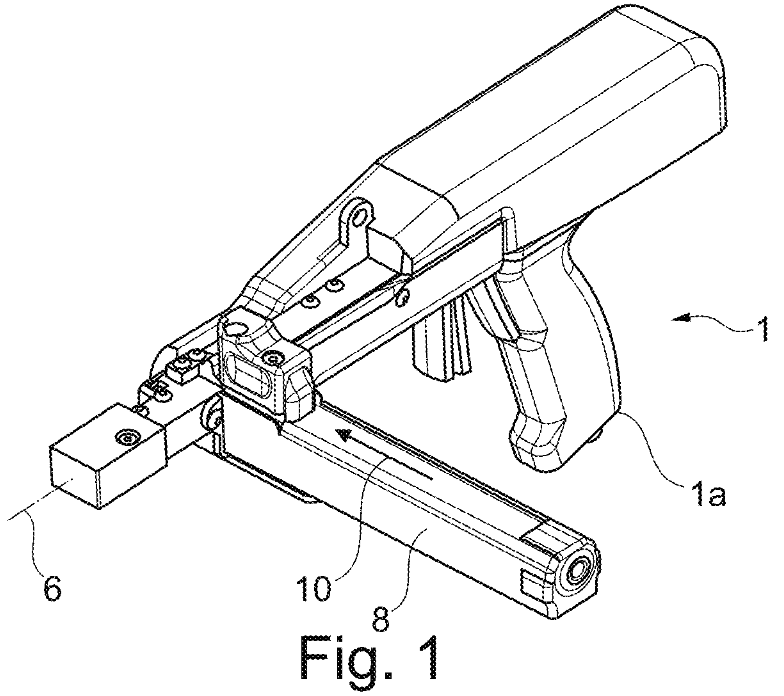
FIG. 1 is a perspective view of a fastening tool.

FIG. 1 is a perspective view of a fastening tool 1. Said fastening tool has a handle 1*a* and a magazine 8 in which fastening elements are stored which are conveyed to an impact position in the conveying direction 10. The impact tool is not visible in FIG. 1, but is shown in more detail in FIG. 2. The fastening tool conveys fasteners to a workpiece in the direction of the impact axis 6 by means of the impact tool. The magazine 8 can be replaceable as a whole so that a new magazine fitted with fasteners can be attached to the fastening tool 1. However, it can also be provided to refill the magazine 8 after the fastening elements have been used up.

Figure 2:
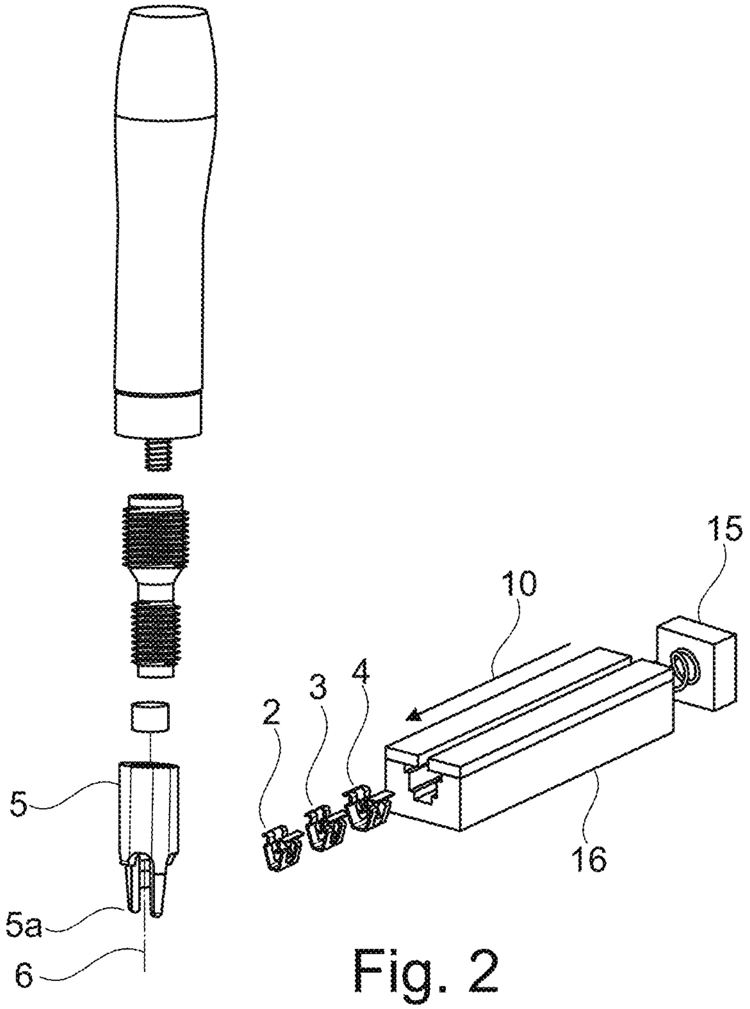
FIG. 2 is a perspective view of an impact tool as well as a rail and fastening elements.

FIG. 2 shows an impact tool 5, the tip 5*a* of which is designed to interact with the fastening elements 2, 3, 4. The fastening elements 2, 3, 4 are shown in an exploded view one behind the other in the conveying direction 10 and are conveyed one after the other to a loading position below the tip 5*a* of the impact tool 5. The impact tool can then convey one fastening element at a time to a workpiece in the direction of the impact axis 6. FIG. 2 also shows a rail 16, the cross section of which is designed such that the fastening elements 2, 3, 4 can be arranged therein one behind the other in the conveying direction 10 and are displaced to the loading position by a drive in the conveying direction 10, i.e. in the direction of the impact tool 5. A drive element 15 is shown only symbolically at the end of the rail 16 opposite the impact tool 5 and can, for example, contain a compression spring that conveys the fastening elements in the direction of the impact tool 5.

Figure 3:
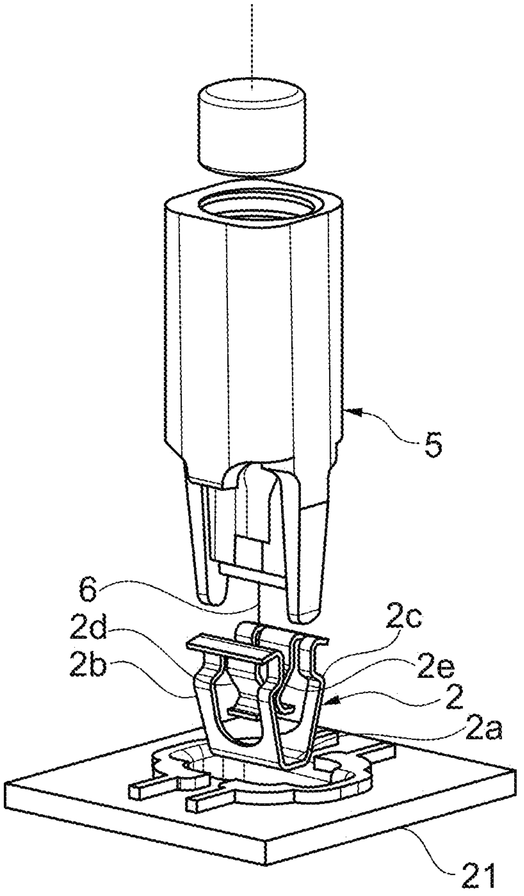
FIG. 3 is a perspective view of a detail of the impact tool and a fastening element.

FIG. 3 is a perspective view of an impact tool 5 which is moved towards a fastening element 2 in the direction of the impact axis 6 by a drive of the fastening tool, which drive is not shown in detail, in order to move said impact tool to a workpiece 21 and anchor it there. FIG. 3 shows details of the fastening element 2. Said fastening element consists of a bent metal sheet with a base 2*a* and two legs 2*b*, 2*c* extending from the base, wherein the legs together with the base form a U-shape in cross section. The legs can run approximately parallel to each other, or at least their longitudinal extension directions can run parallel to each other or at an acute angle to each other. The legs 2*b*, 2*c* do not run straight for reasons of stability and to allow a form fit in a workpiece 21, but are bent in cross section to form a profile. In addition, sheet metal tongues 2*d*, 2*e* are punched out of the individual legs 2*b*, 2*c* and are bent inwards towards the gap between the legs. As will be explained in more detail below, the sheet metal tongues 2*d*, 2*e* each form opposing surfaces for a stop surface of an adjustment tool for positioning the fastening element in the conveying direction 10.

Figure 4:
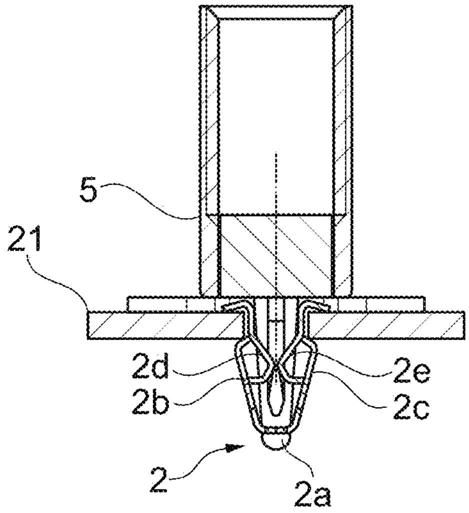
FIG. 4 shows, in a sectional view, a part of an impact tool with a fastening tool.

FIG. 4 is a cross-sectional view of part of an impact tool 5 and a fastening element 2. This illustration shows the legs 2*b*, 2*c* and the sheet metal tongues 2*d*, 2*e*.

Figure 5:
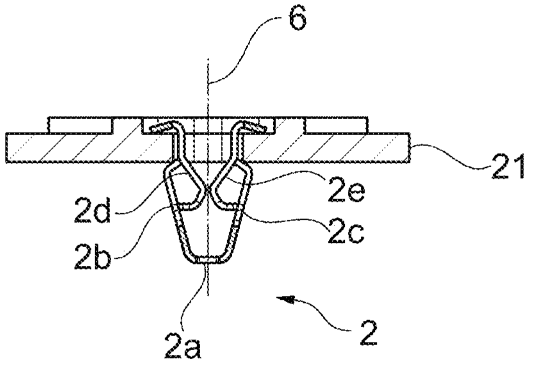
FIG. 5 shows a fastening element in the fastening position.

FIG. 5 shows an individual fastening element 2 in the fastening position on a workpiece 21, wherein the fastening element is inserted in the direction of the impact axis 6. Once one or more fastening elements have been fastened to a workpiece, they can be used to connect the workpiece to another component.

Figure 6:
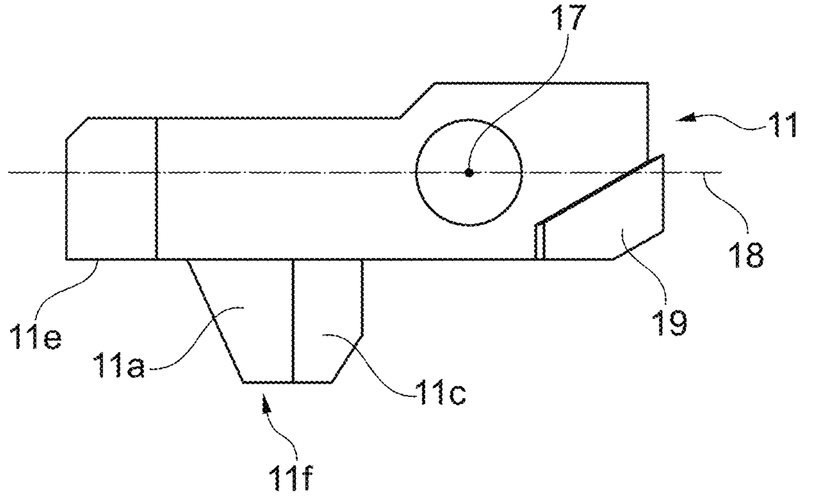
FIG. 6 is a side view of an adjustment tool.
Figure 7:
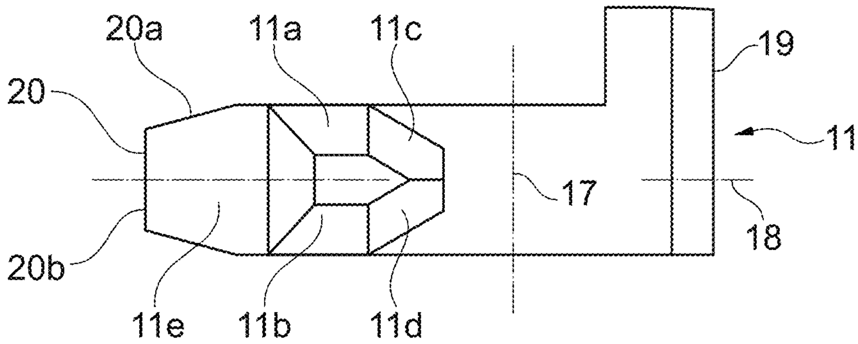
FIG. 7 is a front view of the adjustment tool from FIG. 6.
Figure 8:
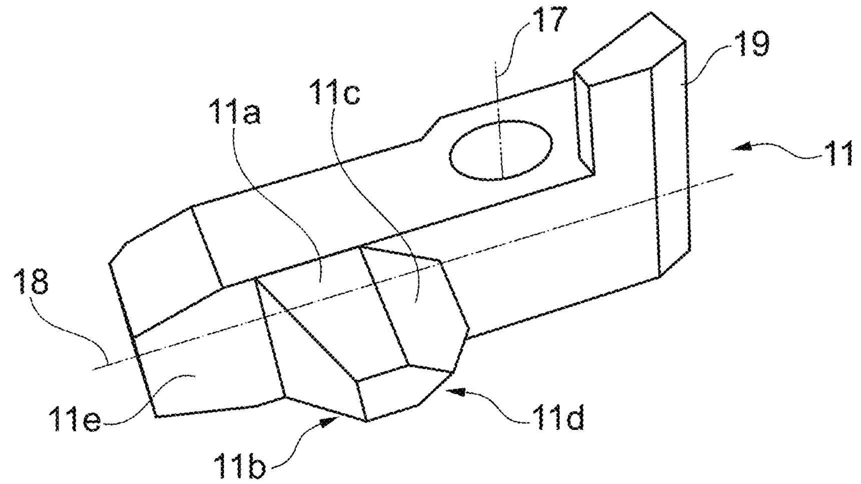
FIG. 8 is a perspective view of the adjustment tool, FIG. 9, 10, 11 show a plurality of fastening elements and an adjustment element in various positions during operation in a side view.

FIGS. 6, 7 and 8 show, in various views, an adjustment tool 11 with its details. The function of the adjustment tool will now be explained in more detail below with reference to FIGS. 9 to 14.

The adjustment tool 11 is designed as a lever that can be pivoted about an axis 17 on the fastening tool. A longitudinal axis of the adjustment tool 11 is labeled 18. The adjustment tool 11 has a drive arm 19 which extends in a direction perpendicular to the longitudinal axis 18 and to which a pivot drive is attached. On a front side surface, the adjustment tool 11 has an elevation 11*f* in the form of a truncated pyramid on which various adjustment surfaces 11*a*, 11*b*, 11*c*, 11*d* are arranged. The adjustment surfaces 11*a*, 11*b*, 11*c*, 11*d* formed as inclined surfaces are each designed as flat surfaces which are inclined towards each other. In another embodiment, these surfaces can also be partially rounded and optionally have flat partial surfaces. Among the adjustment surfaces 11*a*, 11*b*, 11*c*, 11*d* designed as inclined surfaces, the inclined surfaces 11*a*, 11*b* are referred to here as lateral inclined surfaces, while the inclined surfaces 11*c*, 11*d* are referred to in this text as upper inclined surfaces.

In the region of the free end 20 of the adjustment tool 11, as can be seen in FIG. 7, this extends in a taper which is defined by the chamfers 20*a*, 20*b*. As explained below, this taper allows the fastening elements to be conveyed past the adjustment tool to the loading position when the adjustment tool 11 is in the release position.

In the region of the taper at the free end 20 of the adjustment tool, an adjustment surface 11*e* is also provided on the front side surface thereof, on which the elevation 11*f* is also arranged, which adjustment surface is designed as a stop surface and, when the adjustment tool is in the adjustment position 11, interacts with the inwardly bent sheet metal tongues 2*d*, 2*e* of the fastening elements. The two lateral inclined surfaces 11*a*, 11*b* are arranged symmetrically to the longitudinal axis 18, as are the upper inclined surfaces 11*c*, 11*d* which run towards each other in the direction of the longitudinal axis 18 and form the shape of a ship's bow.

Figure 9:
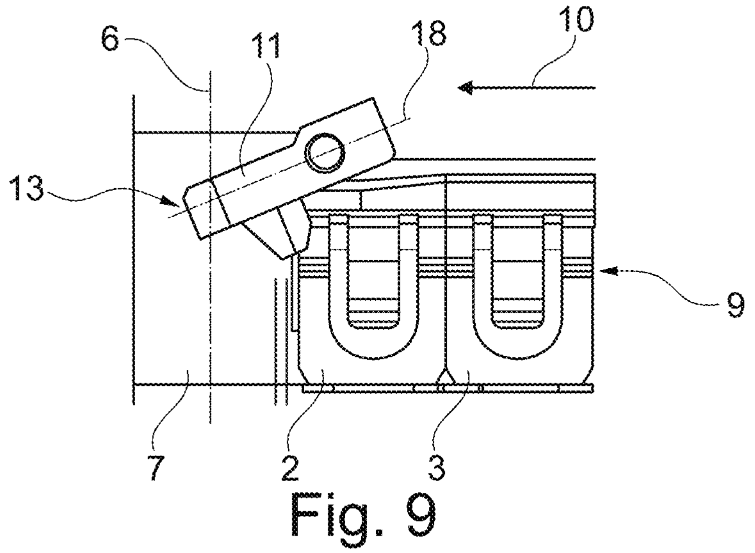
Figure 10:
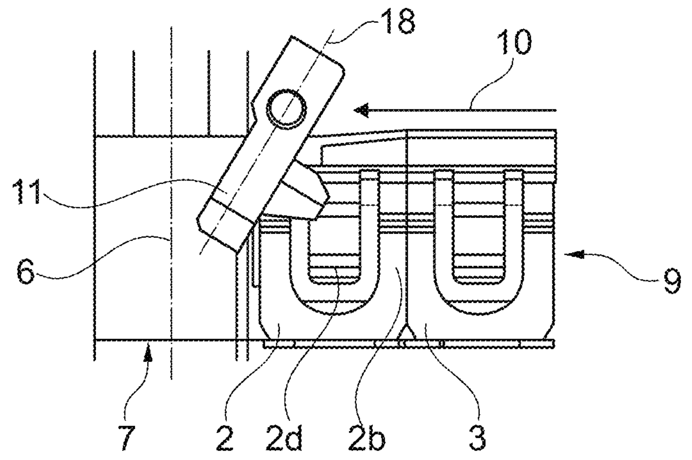
Figure 11:
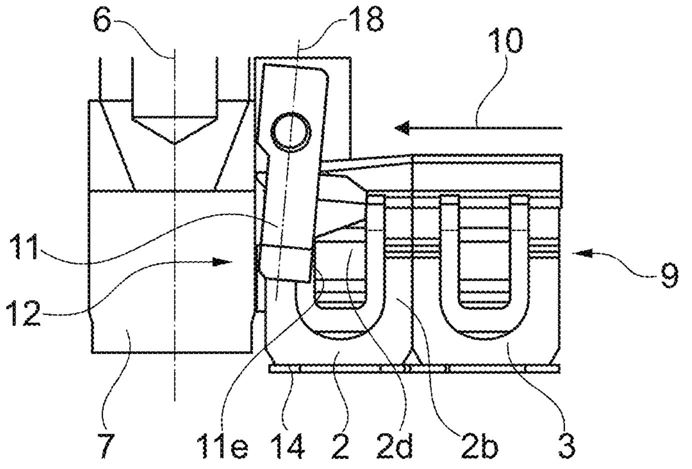

FIGS. 9, 10 and 11 show in particular the function of the adjustment tool 11 during the separation of the fastening elements 2, 3, 4 in the conveying direction 10 and the adjustment of the last fastening element not yet conveyed into the loading position in its desired position in the conveying direction 10.

FIG. 9 shows a plurality of fastening elements 2, 3 arranged one behind the other in the conveying direction 10, which lie in a rail 16 as shown for example in FIG. 2. The fastening elements 2, 3 can, for example, be arranged directly one behind the other without spacing and pressed by a drive element 15 in the form of a spring in the conveying direction 10 towards a loading position 7 which lies along the direction of movement/conveying direction of the fastening elements at the height of the impact axis 6. In the loading position 7, the fastening element located there can then be conveyed to a workpiece in the direction of the impact axis 6 by means of an impact tool not shown in FIG. 9. In order for the impact tool to be able to act on the fastening element located in the loading position 7 without interference, the other fastening elements (designated 2 and 3 in FIG. 9, 10, 11) should be spaced some distance away from the loading position 7, or at least held in a defined position relative to the loading position 7. For this purpose, the penultimate fastening element 2 can be brought into a desired position by the adjustment tool 11.

In FIG. 9, the adjustment tool 11 is pivoted into a release position in which the longitudinal axis 18 of the adjustment tool 11 assumes an almost horizontal position. In this position of the adjustment tool, a fastening element can be moved under the adjustment tool in the conveying direction 10 to the loading position. The chamfers 20*a*, 20*b* allow the fastening elements to be moved underneath the adjustment tool 11 without having to bring it into a completely horizontal position.

In this way, the adjustment tool 11 can also be pivoted through the fastening element which has reached the loading position 7 towards the penultimate fastening element 2 which is to be held in a desired position.

The fastening elements 2, 3 which move in the conveying direction 10 along said rail in a magazine 8 pass through a space that is referred to as the loading path 9. The adjustment tool 11 partially engages in this space, i.e. in the loading path 9, in order to achieve an adjustment of the fastening elements 2, 3 in the conveying direction 10 and perpendicular to the conveying direction 10.

To clarify, it should be noted that in FIG. 9, 10, 11, the last fastening element which is located in the region of the impact axis 6 is not shown for reasons of clarity.

FIG. 10 shows a position of the adjustment tool 11 in which it is pivoted slightly counter to the conveying direction 10 towards the fastening element 2. This movement of the adjustment tool 11 counter to the conveying direction 10 of the fastening elements into its adjustment position can be achieved, for example, by the impact tool driving the adjustment tool directly or by means of a mechanical coupling element (not shown) during its downward movement. The adjustment tool 11 can then be pivoted back into its release position, for example after the backward movement of the impact tool, by a spring drive that is attached to the drive arm 19 of the adjustment tool 11.

FIG. 11 shows the adjustment position of the adjustment tool 11 in which the longitudinal axis 18 of the adjustment tool is oriented completely or almost vertically. In this adjustment position, the adjustment tool 11 holds the fastening element 2 in a desired position in that the stop surface 11*e* strikes the inwardly bent sheet metal tongues 2*d*, 2*e* of the legs 2*b*, 2*c* of the fastening element 2. The drive force which acts on the adjustment tool 11 is sufficient to push the fastening element 2 back slightly counter to the conveying direction 10 and to distance it from the last fastening element in the loading position 7, which is not shown. In this position, the fastening element in the loading position can then be conveyed to a workpiece by means of the impact tool.

Figure 12:
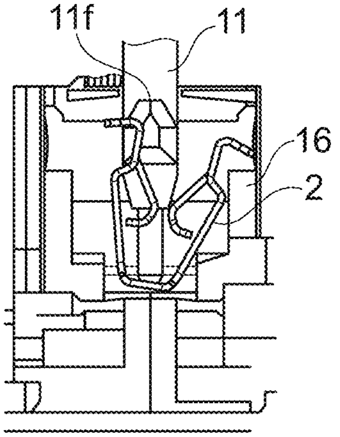
FIG. 12 shows a fastening element before adjustment in a view in the conveying direction of the fastening elements.
Figure 13:
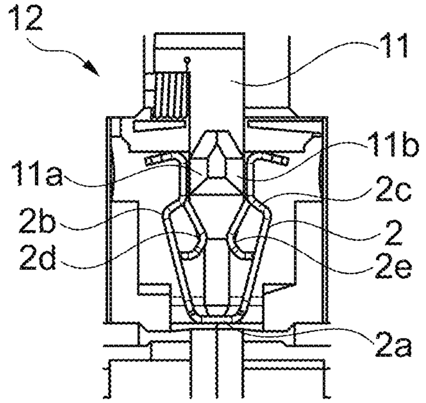
FIG. 13 shows a fastening element after adjustment in a representation as in FIG. 12.
Figure 14:
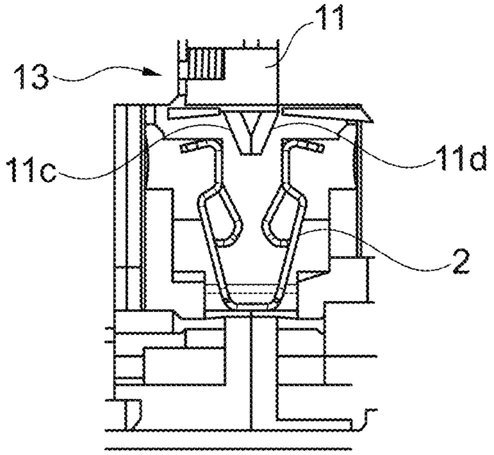
FIG. 14 shows a fastening element in the release position of the adjustment element in a representation as in FIGS. 12 and 13.

FIGS. 12, 13 and 14 each show a fastening element 2 and an adjustment tool 11 in different positions when viewed in the conveying direction 10. FIGS. 12 and 13 each show the front side surface of the adjustment tool 11 on which the adjustment pyramid 11*f* is located.

FIG. 12 shows a situation in which the fastening element 2 lies unadjusted at an angle in the rail 16. In this position, the adjustment tool 11 and in particular the adjustment pyramid 11*f* are not yet in adjusting engagement with the fastening element 2. The different fastening elements, which are arranged one behind the other along the rail, can vary slightly in size and shape, and the rail 16 is designed in such a way that it provides enough space for the different shape and size variations of the fastening elements. This means that certain tolerances can be permitted in the production of the fastening elements. On the other hand, the fastening elements are therefore not completely fixed in their lateral position in the rail 16, i.e. in the directions perpendicular to the conveying direction 10. In order to achieve sufficient adjustment when moving the fastening elements into the loading position 7, they should be adjusted in the desired position 14 by means of the adjustment tool 11 both in the conveying direction 10 and in the directions perpendicular to this conveying direction.

In FIG. 13, the adjustment tool 11 is shown in a position in which it is almost vertical, as also shown in FIG. 11, and is in engagement with the legs 2*a*, 2*b* of the fastening element 2. The lateral inclined surfaces 11*a*, 11*b* touch the legs 2*b*, 2*c* of the fastening element 2 and thereby center the fastening element 2. In addition, the stop surface 11*e* strikes the sheet metal tongues 2*d*, 2*e* and therefore adjusts the fastening element 2 in the conveying direction 10. In this illustration, the adjustment tool 11 is in its adjustment position, while the fastening element 2 is in its desired position.

FIG. 14 shows a position of the adjustment tool 11 in which it is largely pivoted out of the loading path 9 and the longitudinal axis 18 of the adjustment tool 11 is horizontal. Only the adjustment pyramid 11*f* still protrudes into the movement path, wherein the fastening element 2 can be moved past the adjustment pyramid 11*f* in the conveying direction. The upper inclined surfaces 11*c*, 11*d* of the adjustment pyramid act in such a way that they protrude between the legs of the fastening element 2 and guide them further during the movement into the loading position so that the fastening element 2 remains adjusted into the loading position 7. As soon as the fastening element 2 is in the loading position 7, the adjustment tool 11 pivots back and brings the penultimate fastening element which is located behind the fastening element 2, for example the fastening element 3, into its desired position.

With the described design of the fastening tool and the adjustment tool as well as the magazine suitable for the fastening tool, fast processing of fastening elements one after the other can be realized without any problems, wherein the fastening elements are each adjusted in a desirable form for the use of an impact tool in a loading position. The described design largely prevents incorrect positioning and therefore interference when the fastening elements are moved forward, which could block the fastening tool.

What is claimed is:

1. A fastening tool for applying fastening elements to a workpiece, the fastening tool comprising:

an impact tool configured to convey one fastening element at a time along an impact axis from a loading position within the fastening tool to a workpiece, wherein the fastening tool is configured to accommodate a magazine in which a plurality of fastening elements are arranged displaceably one behind another along a loading path in a conveying direction towards the loading position; and an adjustment tool having at least one adjustment surface which is guided movably counter to the conveying direction of the plurality of fastening elements in such a way that the adjustment tool engages in the loading path, wherein:

the adjustment tool is arranged pivotably between an adjustment position and a release position;

each fastening element of the plurality of fastening elements includes a base and two legs fastened to the base, wherein the adjustment tool includes at least two adjustment surfaces;

the at least two adjustment surfaces are lateral inclined surfaces oriented opposite one another in such a way that each of the lateral inclined surfaces comes into contact with a leg of at least one fastening element;

when the adjustment tool is in the adjustment position, the at least two adjustment surfaces are arranged mirror-symmetrically with respect to a symmetry surface in which both the impact axis and the conveying direction run; and in order to align the fastening elements while the fastening elements move to the loading position, at least one adjustment surface is configured to, regarding a particular fastening element displace the particular fastening element in at least one direction perpendicular to the conveying direction using a wedge effect into a desired position when the adjustment tool is moved counter to the conveying direction of the plurality of fastening elements.

2. The fastening tool according to claim 1, wherein the adjustment tool is arranged pivotably between an adjustment position and a release position, wherein the adjustment tool in the adjustment position engages with the particular fastening element which has been displaced, and wherein the adjustment tool in the release position releases movement of the plurality of fastening elements along the loading path towards the loading position.

3. The fastening tool according to claim 1, wherein the adjustment tool has one or more adjustment surfaces, wherein the one or more adjustment surfaces are inclined surfaces configured to interact with one or more parts of the particular fastening element and to exert a displacement force thereon perpendicular to the conveying direction.

4. The fastening tool according to claim 1, wherein the at least two adjustment surfaces are oriented relative to one another in such a way that the at least two adjustment surfaces or an imaginary extension of the at least two adjustment surfaces intersect in a line perpendicular to the conveying direction when the adjustment tool is in the adjustment position.

5. The fastening tool according to claim 1, wherein the adjustment tool includes an adjustment pyramid designed as a truncated pyramid, and is delimited by multiple adjustment surfaces, wherein the multiple adjustment surfaces are inclined surfaces.

6. The fastening tool according to claim 1, wherein the adjustment tool is arranged pivotably between an adjustment position and a release position, wherein the adjustment tool has at least one adjustment surface, wherein the at least one adjustment surface is a stop surface which, when the adjustment tool is in the adjustment position in which the adjustment tool is engaged with at least one fastening element of the plurality of fastening elements to be displaced to the desired position, is oriented perpendicular to the conveying direction and is oriented in such a way that the adjustment tool strikes against a surface or an edge of the at least one fastening element which is oriented in particular perpendicular to the conveying direction.

7. The fastening tool according to claim 6, wherein the adjustment tool has a shape of a pivoting lever and tapers towards a free end in a region of the stop surface, wherein the region of the stop surface is perpendicular to the conveying direction when the adjustment tool is in the adjustment position.

8. The fastening tool according to claim 1, wherein the plurality of fastening elements include a base and two legs fastened to the base, wherein longitudinal extension directions of the two legs of each fastening element of the plurality of fastening elements enclose an angle of less than 180 degrees.

9. The fastening tool according to claim 1, wherein the fastening tool is set up to process fastening elements with a base and two legs fastened to the base, wherein both the base and the two legs are in each case formed by metal sheets which extend in the conveying direction in the desired position of the fastening elements.

10. An adjustment tool for a fastening tool for applying fastening elements to a workpiece, the fastening tool comprising an impact tool configured to convey a fastening element along an impact axis from a loading position within the fastening tool to a workpiece, wherein the fastening element is one of a plurality of fastening elements, each fastening element including a base and two legs fastened to the base and being displaceable in the fastening tool in a conveying direction towards the loading position, wherein:

the adjustment tool includes a plurality of adjustment surfaces;

the plurality of adjustment surfaces are inclined surfaces for adjusting the fastening element;

at least two adjustment surfaces of the plurality of adjustment surfaces are lateral inclined surfaces oriented opposite one another in such a way that each of the lateral inclined surfaces comes into contact with a leg of at least one fastening element;

when the adjustment tool is in the adjustment position, the at least two adjustment surfaces are arranged mirror-symmetrically with respect to a symmetry surface in which both the impact axis and the conveying direction run; and in order to align the fastening elements while the fastening elements move to the loading position, the lateral inclined surfaces are arranged in a way to displace a particular fastening element in at least one direction perpendicular to the conveying direction into a desired position using a wedge effect, when the adjustment tool is moved counter to the conveying direction of the plurality of fastening elements.

11. A method for conveying fastening elements, the method comprising:

arranging a plurality of fastening elements one behind another within a magazine of a fastening tool in a conveying direction to a loading position, from which a particular fastening element of the plurality of fastening elements is conveyed to a workpiece using an impact tool, wherein the particular fastening element is located directly upstream of the loading position;

exerting a force on the plurality of fastening elements in a direction of the loading position by using a drive element; and displacing the particular fastening element into a desired position using an adjustment tool, wherein, in order to align the fastening elements while the fastening elements move to the loading position, the adjustment tool moves counter to the conveying direction for adjustment parallel to the conveying direction and the particular fastening element is adjusted perpendicular to the conveying direction using a wedge effect by at least one of two adjustment surfaces of the adjustment tool, wherein the two adjustment surfaces are inclined surfaces, and wherein, when the adjustment tool is in the adjustment position, the two adjustment surfaces are arranged mirror-symmetrically with respect to a symmetry surface in which both an impact axis and the conveying direction run.

* * * * *